United States Patent
Korczyc et al.

(10) Patent No.: US 12,410,783 B2
(45) Date of Patent: Sep. 9, 2025

(54) SPACECRAFT PROPULSION SYSTEM AND METHOD OF OPERATION

(71) Applicant: ICEYE OY, Espoo (FI)

(72) Inventors: Jakub Korczyc, Espoo (FI); Jonathan De Holanda, Espoo (FI); Rafal Modrzewski, Espoo (FI)

(73) Assignee: ICEYE OY, Espoo (FI)

( * ) Notice: Subject to any disclaimer, the term of this patent is extended or adjusted under 35 U.S.C. 154(b) by 0 days.

(21) Appl. No.: 17/772,978

(22) PCT Filed: Oct. 14, 2021

(86) PCT No.: PCT/EP2021/078449
§ 371 (c)(1),
(2) Date: Apr. 28, 2022

(87) PCT Pub. No.: WO2022/079168
PCT Pub. Date: Apr. 21, 2022

(65) Prior Publication Data
US 2024/0125308 A1    Apr. 18, 2024

(30) Foreign Application Priority Data
Oct. 15, 2020   (GB) .................................... 2016363

(51) Int. Cl.
*F03H 1/00*    (2006.01)
*B64G 1/40*    (2006.01)

(52) U.S. Cl.
CPC ......... *F03H 1/0025* (2013.01); *F03H 1/0012* (2013.01); *B64G 1/413* (2023.08)

(58) Field of Classification Search
CPC ..... F03H 1/0062; F03H 1/0068; F03H 1/0075
See application file for complete search history.

(56) References Cited

U.S. PATENT DOCUMENTS

| 6,279,314 B1 | 8/2001 | Valentian et al. |
| 6,362,574 B1 | 3/2002 | Aguero et al. |
| | (Continued) | |

FOREIGN PATENT DOCUMENTS

| CN | 103917779 A | 7/2014 |
| EP | 0890739 A1 | 1/1999 |
| | (Continued) | |

OTHER PUBLICATIONS

Trent "Control of the Electron Energy Distribution Function (EEDF) in a Hall Thruster Plasma" (Year: 2016).*

(Continued)

*Primary Examiner* — David P. Olynick
(74) *Attorney, Agent, or Firm* — Cozen O'Connor

(57) ABSTRACT

A method of operating a spacecraft propulsion system comprises injecting electrons into the plasma surrounding the spacecraft prior to creating the stream of ions, and after commencing creation of the ion stream, continuing the injection of electrons in an amount sufficient to maintain the spacecraft at a positive potential. This method may be implemented in a single thruster. In spacecraft with multiple thrusters the same method may be implemented in each thruster.

Where the propulsion system comprises a plurality of thrusters, the method may comprise: operating at least one of the thrusters as a drive thruster, and operating at least one of the thrusters as an auxiliary or "reserve" thruster. The electron source of the at least one auxiliary thruster may be operated before creation of the ion stream to inject the electrons into the plasma surrounding the spacecraft.

14 Claims, 9 Drawing Sheets

(56) References Cited

U.S. PATENT DOCUMENTS

| | | | |
|---|---|---|---|
| 6,449,941 | B1 | 9/2002 | Warboys et al. |
| 6,948,305 | B2 | 9/2005 | Beattie et al. |
| 9,312,102 | B2 | 4/2016 | Kamiya et al. |
| 2003/0019329 | A1 | 1/2003 | Sugitatsu et al. |
| 2005/0005593 | A1 | 1/2005 | Beattie et al. |
| 2005/0046358 | A1 | 3/2005 | Hilbers et al. |
| 2006/0186837 | A1* | 8/2006 | Hruby .................. F03H 1/0075 315/501 |
| 2013/0300288 | A1 | 11/2013 | Aanesland et al. |
| 2014/0208713 | A1* | 7/2014 | Lorand .................. B64G 1/428 60/202 |
| 2020/0102100 | A1 | 4/2020 | Lozano et al. |
| 2021/0100089 | A1 | 4/2021 | Daykin-Iliopoulos et al. |

FOREIGN PATENT DOCUMENTS

| | | |
|---|---|---|
| JP | 2000-278995 | 10/2000 |
| WO | 2019/215335 A1 | 11/2019 |

OTHER PUBLICATIONS

Malcom "Flight Software in the Space Department: A Look at the Past and a View Toward the Future" (Year: 1999).*

Rubin "Fast Starting Hollow Cathodes for Sounding-Rocket-Based Tether Experiments" (Year: 2015).*

"Proceedings of the Spacecraft Charging Technology Conference," https:play.google.com/store/books/details?id=kdqrS9Xz7oQC&rdid=book-kdqrS9Xz7oQC&rdot=1—Feb. 18, 2020—by C.P. Pike—Books on Google Play, (3 Pages).

PCT International Preliminary Report on Patentability and Written Opinion from related PCT Application No. PCT/EP2021/078449 dated Apr. 13, 2023.

Chinese Office Action issued in connection with related Chinese Patent Application No. 202180065532.1 dated Jun. 12, 2024.

Japanese Office Action issued in related Japanese Patent Application No. 2023-522947 dated Jul. 6, 2024.

Australian Office Action issued in related Australian Patent Application No. 2021360214 dated Aug. 8, 2024.

Canadian Office Action issued in related Canadian Patent Application No. 3,191,559 dated Jul. 31, 2024.

Korean Office Action issued in related Korean Patent Application No. 10-2023-7011013 dated Sep. 2, 2024.

Chinese Office Action issued in related Chinese Patent Application No. 202180065532.1 dated Aug. 7, 2024.

U.A.E. Office Action issued in related U.A.E. Patent Application No. P6000796/2923 dated Aug. 1, 2024.

Canadian Office Action issued in related Canadian Patent Application No. 3,191,559 dated Mar. 25, 2025.

Chinese Office Action issued in connection with related Chinese Patent Application No. 202180065532.1 dated Jan. 7, 2025.

* cited by examiner

SPACECRAFT PROPULSION SYSTEM AND METHOD OF OPERATION

This application is a National Stage Application of International Application No. PCT/EP2021/078449, filed on Oct. 14, 2021, which claims benefit of and priority to GB Patent Application No. 2016363.0, filed on Oct. 15, 2020, all of which are hereby incorporated by reference in their entirety for all purposes as if fully set forth herein.

The present invention relates to spacecraft propulsion. The invention may be used in communication satellites and any other kinds of spacecraft.

BACKGROUND

Communication satellites, orbiting around the earth, are increasingly used in a variety of applications, for example tracking positions of objects, surveying sites, and observing changing weather patterns. Satellites and other spacecraft are commonly provided with an electric propulsion system comprising one or more ion thrusters. In an ion thruster, a neutral gas is ionised by extracting electrons from it to create a steam of positive ions. The ions are accelerated, for example by a potential difference between successive grids, to generate the thrust. The extracted electrons are then injected into the ion stream so that the gas becomes neutral again and can disperse in space. Alternatively, the ions may be extracted from metal, in which case the resulting electrons may be ejected to avoid the metal being negatively charged. The source of the extracted electrons is referred to in the art as a neutraliser.

The term "thruster" is used here unless otherwise stated to refer to a propulsion mechanism comprising an ion source for creating a stream of ions to propel the spacecraft and at least one electron source for emitting electrons, for example to neutralise the stream of ions or to balance the spacecraft charge.

Ideally an orbiting satellite has state-of-the art electronic and other equipment that it needs to function in an optimal state and for an extended period of time without the need of replacement. Therefore one of the many problems of spacecraft development is to minimise damage to components during its operation.

Embodiments of the invention are not limited to solving such problems and may include solutions to other problems.

SUMMARY

In some aspects the invention provides methods of operating a spacecraft propulsion system comprising a thruster, wherein the at least one thruster comprises an ion source for creating a stream of ions to propel the spacecraft and an electron source for emitting electrons. One method comprises operating the thruster by controlling the electron source to constrain the production of electrons to ramp up gradually from an OFF state to an ON state of the electron source and/or to ramp down gradually from an ON state to an OFF state of the electron source.

The control may be by means of a control signal which may be a gradually increasing or decreasing voltage, e.g. a ramp. By controlling the electron source in this way, the rate of increase or decrease of electron emission is actively constrained, for example via the control signal, rather than being passively constrained by the capabilities of the hardware components of the electron source. The benefits of this active control will be explained further with reference to specific embodiments of the invention.

Some methods described further here may comprise injecting electrons into the plasma surrounding the spacecraft prior to creating the stream of ions, and after commencing creation of the ion stream, continuing the injection of electrons. The continued injection is in order to maintain the spacecraft at a positive potential with respect to the surrounding plasma, although this is not necessarily measured in practice.

Methods according to the invention may be implemented in a single thruster. In spacecraft with multiple thrusters the same method may be implemented in more than one thruster.

Where the propulsion system comprises a plurality of thrusters, a method according to some embodiments of the invention may comprise operating at least one of the thrusters as an auxiliary or "reserve" thruster. The electron source of the at least one auxiliary thruster may be operated before creation of the ion stream to inject the electrons into the plasma surrounding the spacecraft. Then, after the electron stream produced by the auxiliary thruster(s) has reached a predetermined level, the ion source and the electron source of the drive thruster(s) may be operated to drive the spacecraft whilst continuing to operate the auxiliary thruster to inject the electrons to maintain the spacecraft at the positive potential. In this method the ion source of the auxiliary thruster is not operated.

Where multiple thrusters are operated any one or more of the following may be carried out to complement the gradual turning on or off of the electron sources:

- operating at least one electron source of each drive thruster to inject electrons into the plasma surrounding the spacecraft prior to operating the ion source to create an ion stream to propel the spacecraft;
- continuing to operate at least one electron source of each drive thruster to inject electrons into the plasma after operation of the ion source of the same drive thruster has ceased;
- commencing operation of an electron source of each of the drive thrusters before commencing operation of any of the ion sources of any of the drive thrusters, optionally one after another;
- continuing to operate at least one electron source of all of the drive thrusters after operation of all of the ion sources has ceased, optionally ceasing operation one after another;
- commencing operation of the ion sources one after another;
- ceasing operation of the ion sources one after another.

A spacecraft propulsion system may be designed to implement the methods described here and therefore according to a further aspect of the present invention, there is provided a spacecraft propulsion system comprising at least one thruster, the at least one thruster comprising an ion source for creating a stream of ions to propel the spacecraft and at least one electron source, and a controller configured to operate the propulsion system according to any of the methods described here.

Methods according to embodiments of the invention may be carried out in existing spacecraft propulsion systems. Thus according to a further aspect of the present invention, there is provided a computer readable medium comprising instructions which, when implemented in a processor in a spacecraft propulsion system controller cause the system to operate according to any of the methods described here.

It will be understood that this summary was provided to introduce a selection of concepts in a simplified form that will be further described below in the "Detailed Description" section.

This summary is not intended to identify key features or essential features of the claimed subject matter, nor is it intended to be used to determine the scope of the claimed subject matter.

BRIEF DESCRIPTION OF THE DRAWINGS

Some embodiments of the invention will be described, by way of example, with reference to the following drawings, in which.

It should be understood that the drawings are not necessarily drawn to scale.

DETAILED DESCRIPTION

The invention will be understood from the following detailed description of embodiments, which are meant to be descriptive and not limiting. For the sake of brevity, some well-known features methods and systems procedures components and circuits are not described in detail.

Embodiments of the invention provide systems and methods of operating a spacecraft propulsion system. Prior to discussing these in detail, components of a spacecraft in which embodiments of the invention may be implemented are described.

Figure 1:
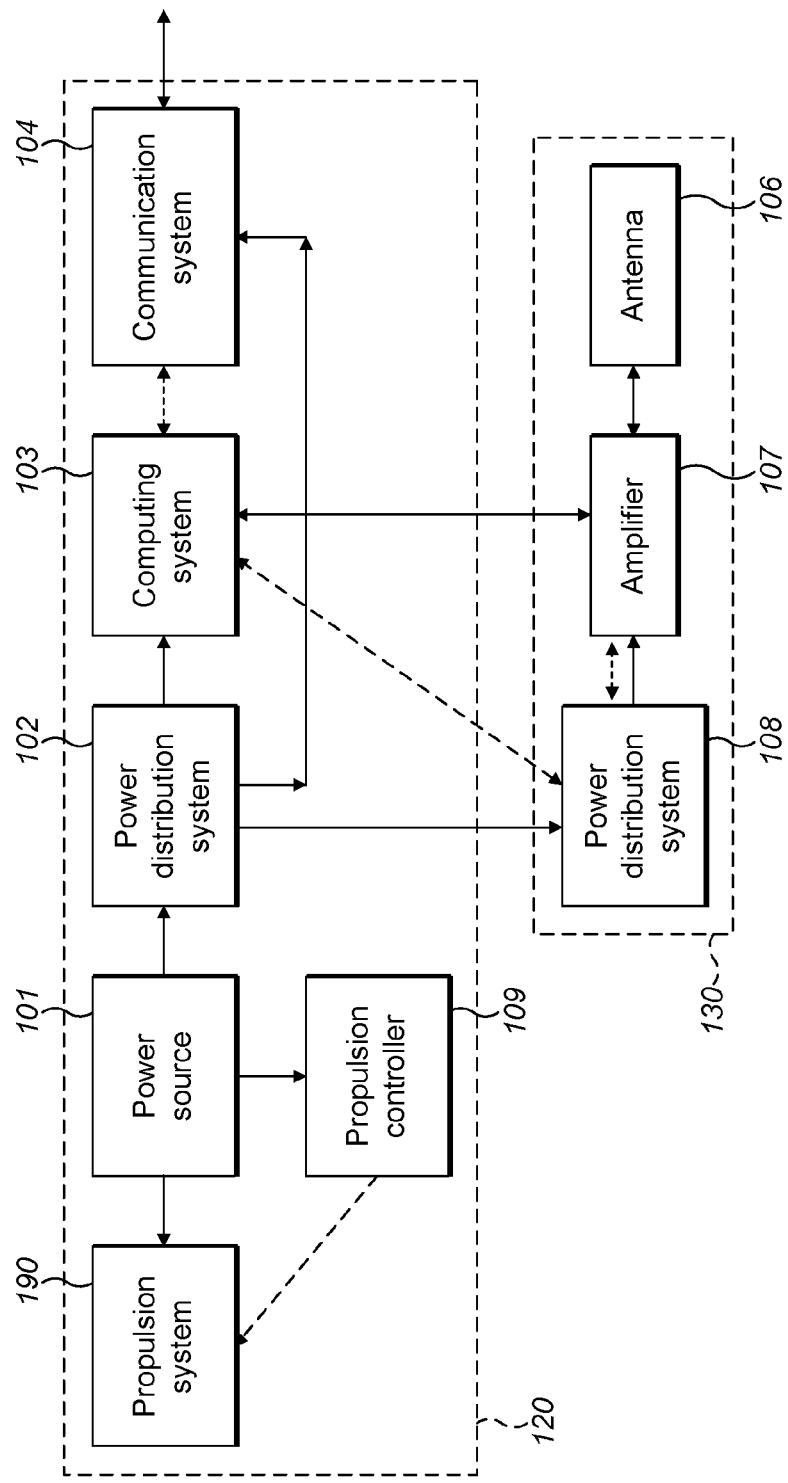
FIG. 1 is a schematic diagram representation of the components of a satellite according to some embodiments of the invention.

FIG. 1 is a schematic diagram representation of the components of a satellite according to some embodiments of the invention. One-directional solid arrows between components are used to indicate power connections, two-directional solid arrows are used to indicate RF signal connections, and dotted lines are used to indicate data connections.

Some components are located at the satellite body, indicated by rectangle 120, and some are located at a wing, indicated by rectangle 130. The satellite shown in FIG. 1 comprises a power source 101 and a power distribution system 102. The power source 101 and power distribution system 102 supply power to a propulsion system 190, propulsion controller 109, computing system 103 and a communication system 104. The propulsion controller 109 is shown here as a separate item but in practice it may form part of the computing system 103. The propulsion controller may be configured to implement methods according to some embodiments of the invention, either through the use of control software implemented in one or more processors comprised in the propulsion controller 109 or on in response to received instructions, for example from the computing system. Where the instructions are transmitted from the computing system 103, the computing system may be considered to comprise a propulsion controller. One of the functions of the propulsion controller 109 may be to output control signals to the ion sources and electron sources of thrusters in the propulsion system 190, to be described further below.

The power source 101, power distribution system 102, computing system 103 and communication system 104 are collectively referred to in the art as the satellite "bus". The communication system 104 may include one or more antennas, for example located on the satellite body. Alternatively the communication system 104 may send and receive signals via one or more antennas on a wing 130.

The power source 101 and power distribution system 102 shown in FIG. 1 may also supply power to one or more sensors, not shown, which may be located at the body 120. The sensors form part of what is known in the art as the satellite "payload". The number and variety of sensors may vary according to the intended use of the satellite.

In the case of an earth observation satellite, the payload may include one or more radar antennas 106 or antenna arrays, which may be located at one or more wings 130. Each antenna 106 or antenna array may have an associated amplifier 107, supplied with power via a power distribution system 108 from power source 101, for example via power distribution system 102. Both power distribution systems 102 and 108 may comprise control logic as is known in the art.

Components of a satellite may suffer damage during use and once the satellite is in orbit it is more difficult to ascertain the source of any damage. The present inventors have postulated that a particular source of damage arises from a component being subject to excessive voltage across it or current through it or power dissipated in it, known as electrical overstress "EOS". This can cause immediate damage or malfunction or may result in a reduction in the lifetime of the component. Some components may be more susceptible to damage than others, in particular some antenna types may be more susceptible to damage than others.

The amplifier 107 has a two way data communication link with the computing system 103, in the illustrated example via the power distribution system 108, and may be configured to send data to the computing system 103 such as data relating to received radar signals. The data may be processed by the communication system 103, for example to provide earth contour data, which may then be output to the communication system 104 for onward transmission. Alternatively raw data may be output by the computing system 103 to the communication system 104 for processing by a remote computing system, on the ground or at another satellite. The computing system 103 may send data to the amplifier 107, for example via the power distribution system 108, such as operating instructions, requests for data and other signals as will be familiar to those skilled in the art.

The communication system 104 may communicate with earth stations or other satellites using radio frequency communication, light, e.g. laser communication, or any other form of communication as is known in the art.

Figure 2:
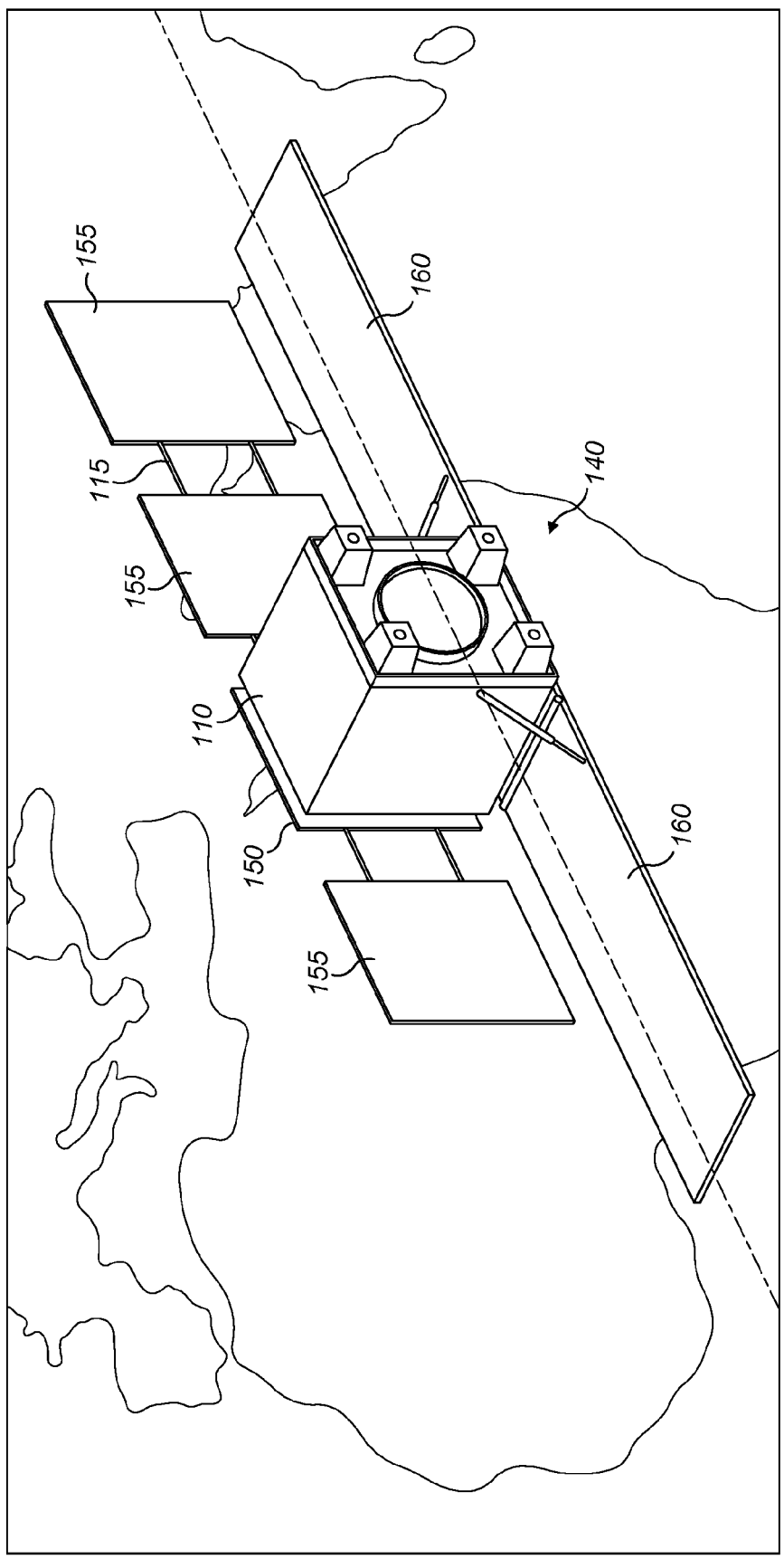
FIGS. 2, 3 and 4 show different perspective views of a satellite, in accordance with some embodiments of the present invention.
Figure 3:
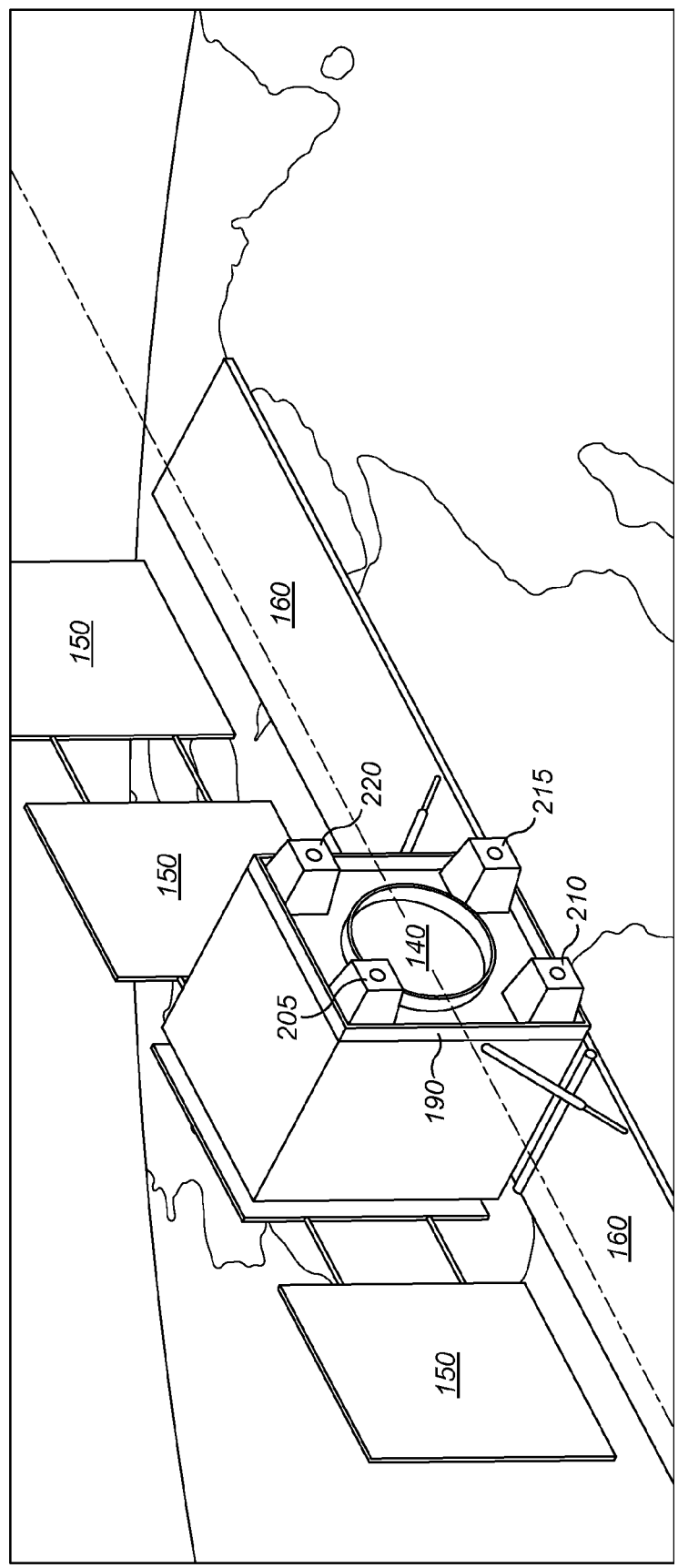
Figure 4:
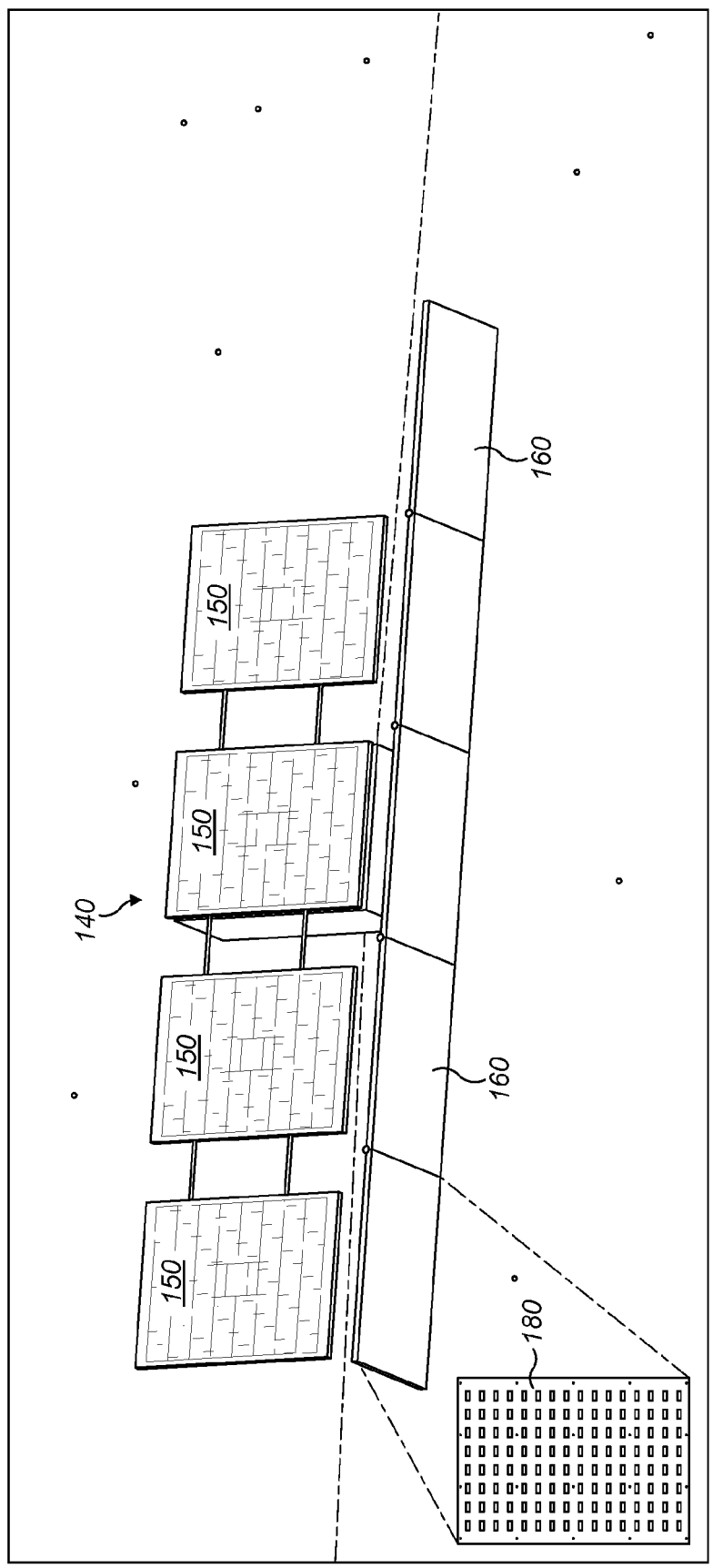

FIGS. 2, 3, and 4 are perspective views of a satellite 140 which may comprise the components of FIG. 1, shown in FIG. 3 orbiting in space. The satellite of FIG. 2 comprises a body 110, in which some of the body 120 components of FIG. 1 may be housed, or on which some of the components of FIG. 1 may be mounted. The body 110 is also referred to in the art as a "bus" since it may house or support the bus components. Body 110 may additionally house one or more batteries. Body 110 may be partially enclosed, for example to house and protect components. A housing may provide surfaces on which components may be mounted. In the example of FIG. 2 a solar panel 150 is mounted on one rectangular surface of the body 110 and additional solar panels 155 are attached to panel 150 by a struts 115.

The satellite 140 comprises a generally planar structure extending from the body 110 in two opposing directions to provide two "wings" 160. The structure comprising wings 160 is shown to be mounted on or adjacent to a rectangular surface of the body 110. As shown most clearly in FIG. 4 it is formed in sections so as to be folded for transport and unfolded when deployed. The body 110 and wings 160 are collectively referred to here as the spacecraft frame and have electrical properties which are described further below.

One or more antennas as described above may be mounted on the satellite "wings". One antenna array 180 is shown removed from the satellite in FIG. 4 for the purpose of illustration and may comprise a patch antenna as is known in the art. Other components may be mounted on the wings as is known in the art including power distribution components and amplifiers, examples of which are described in earlier patent application GB-A-2598793. It has been found that the power control switches of the satellite described in that earlier patent application are particularly susceptible to damage. With different arrangements of components, different components may be more susceptible to damage.

The satellite 140 is provided with a propulsion system 190 for manoeuvring the satellite with a generated thrust. The propulsion system 190 is most clearly visible in FIG. 3 and in this embodiment is mounted on the body 110 on the surface opposite to the solar panels 150.

As shown in FIG. 3, the propulsion system 190 comprises a plurality of thrusters 205, 210, 215, 220 that produce thrust for manoeuvring the satellite 140 when required. The plurality of thrusters 205, 210, 215, 220 shown in FIG. 3 are positioned at the corners of one side of the body 110 and may be equally spaced apart. However, in some embodiments of the present invention, the propulsion system may have a different configuration.

Each of the thrusters shown in FIG. 3 may comprise an ion source for creating a stream of ions to propel the spacecraft and at least one electron source for injecting electrons into the stream of ions to neutralise the stream of ions. Embodiments of the invention may comprise any thruster of this general type. One example is shown in FIG. 5.

Figure 5:
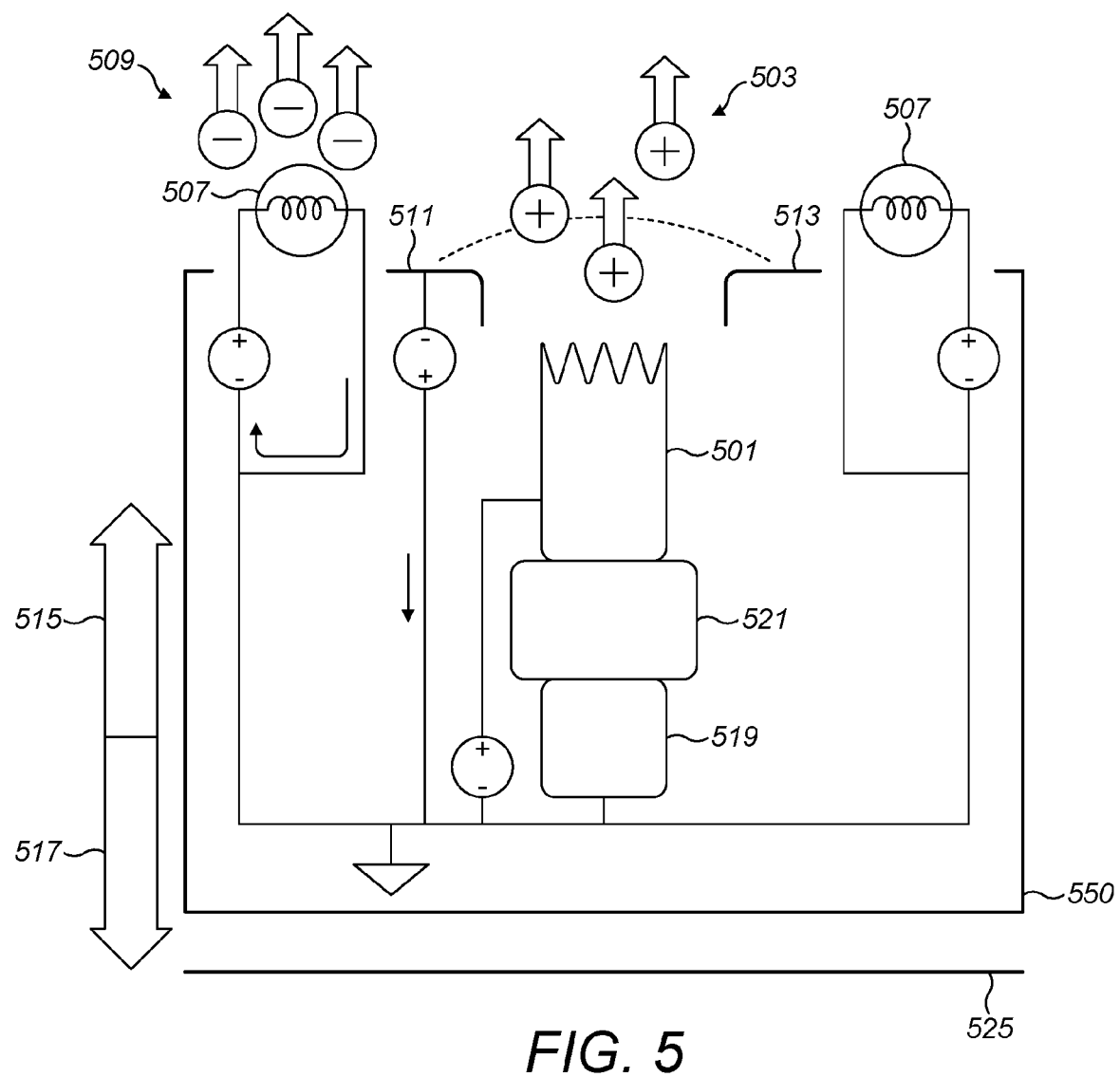
FIG. 5 is a schematic diagram a thruster, in accordance with some embodiments of the present invention.

The thruster shown in FIG. 5 comprises an ion source 501, also referred to as an emitter, for creating a stream of ions 503, and in this example two electron sources in the form of filaments 507 arranged on opposite sides of the ion source 501. As shown one electron source is operating to emit electrons in what is known as a neutraliser beam current 509 to neutralise the stream of ions 503.

The ions are attracted out of the ion source 501 using an extractor 511 and extractor grid 513 to which suitable voltages are applied as is known in the art. This generates a thrust in the direction of arrow 515 and a reaction force 517. Other components shown in FIG. 5 known to those skilled in the art and not material to this invention comprise a heater 519, reservoir 521 and printed circuit board 525. The complete thruster assembly is retained in a housing 550.

It has been found that the operation of the neutraliser, i.e. electron sources, may lead to rapid charging of the spacecraft with respect to the ambient plasma. By ejecting many negatively charged electrons, the spacecraft may have an overall positive charge because it now has more positive ions. In particular this charging may occur very quickly, for example in the space of 1 ms, if the electron sources are simply switched on and permitted to reach their ON state as fast as the electron source hardware will allow. This rapid charging may damage sensitive electronic components on board the spacecraft, particularly but not exclusively antenna arrays and other components mounted at remote locations from the satellite body, regardless of proximity to the thruster, such as the ends of the wings. A similar effect may occur in reverse when the sources are switched off.

Therefore according to some embodiments, the rate at which the electron sources transition from OFF to ON is controlled to constrain the emission of electrons and hence the rate at which the spacecraft frame charge is controlled. Similarly the rate at which the electron sources transition from ON to OFF may be constrained to avoid an immediate cessation of production.

Before describing embodiments of the invention in further detail, possible causes of the damage are firstly discussed in more detail with reference to FIG. 6.

Figure 6:
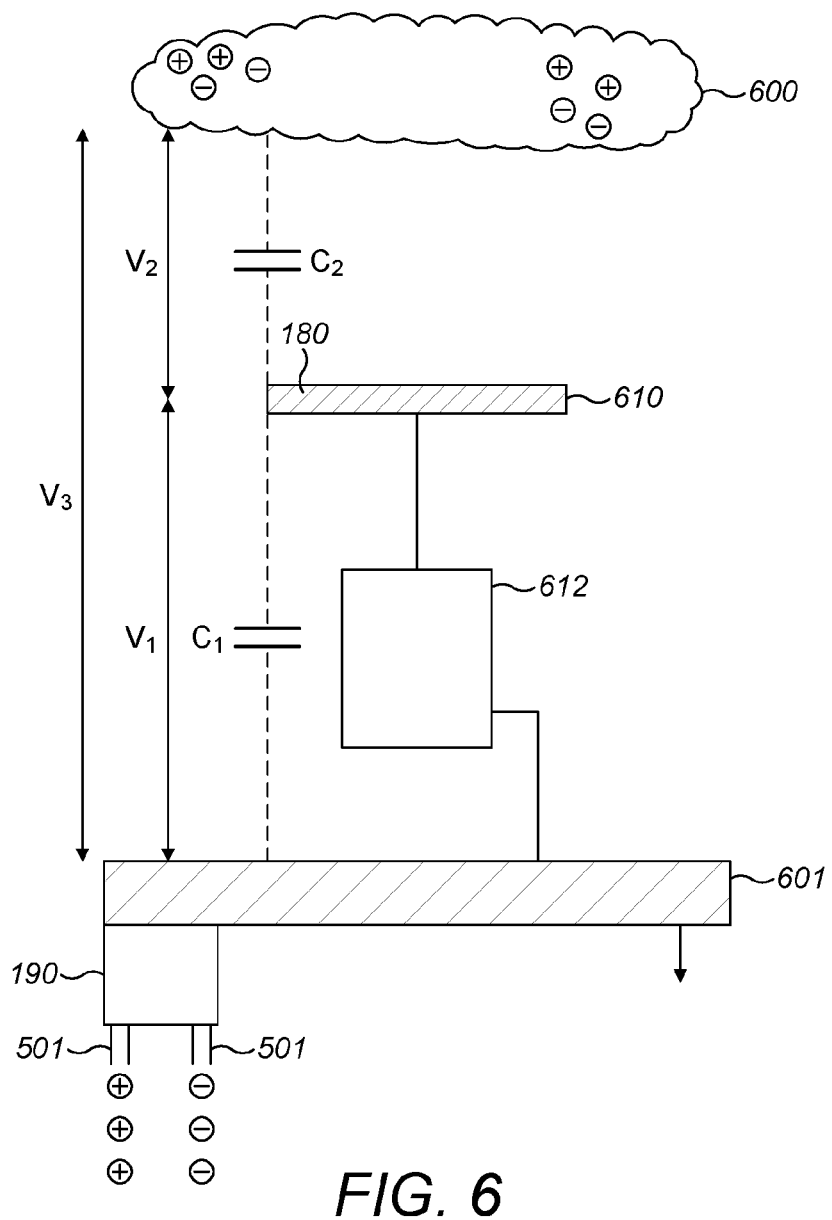
FIG. 6 shows components of a satellite, and voltages and capacitances that may arise between them and the surrounding plasma due to the operation of the propulsion system in accordance with some embodiments of the present invention.

FIG. 6 is a schematic diagram showing components of the satellite 140, and voltages and capacitances that may arise between them and the surrounding plasma due to the operation of the propulsion system 190. Specifically FIG. 6 shows the propulsion system 190, the spacecraft frame denoted as 601, electronic components such as power switching components denoted as 612, metal structures 610 for example in the form of traces or areas on the satellite such as patch antennas 180, and the surrounding plasma 600.

According to FIG. 6, the spacecraft frame 601 is coupled to the metal traces/areas 610, via one or more electronic components 612 and to the propulsion system 190. A potential difference which may arise between the metal structures 610 and the satellite frame 601 is referred to as V1 with an associated capacitance of C1, whilst a potential difference that may arise between the metal structures 610 and the plasma 600 is V2 with an associated capacitance of C2. The sum of V1 and V2 is denoted as V3. These and other electrical effects may be modelled in terms of individual discrete analogue elements, for example using the well-known modelling program SPICE, as described further with reference to FIG. 7.

The present inventors have postulated that a cause of component damage and possibly failure is the creation of high voltage differences due to the rapid change in state of the components of the propulsion system from ON to OFF and vice versa, particularly the electron sources but also the ion sources. In particular, the ejection of electrons from the spacecraft frame 601 leads to the frame 601 changing its potential with respect to the ambient plasma 600. At the same time there is a natural (parasitic) capacitance C2 between metal structures 610 such as antenna patches and other metal traces and the ambient plasma 600. This capacitance C2 may maintain a potential V2 of those metal structures with respect to the plasma for a short time. That may lead to a situation in which the frame 610 is changing potential, i.e. V3 is increasing, and the metal structures are holding potential, i.e. V2 is not changing, with respect to the plasma 600. That causes voltage difference V1 between frame 610 and the patch. Such a voltage difference would damage components by electrical overstress.

Crucial here is the fact that this parasitic capacitance C2 is holding the potential V2 constant for a short while. If the rate of change of the frame potential change was slow enough (slower than capacitance C2 can 'hold it') the risk of damage to components 612 would be mitigated.

Figure 7:
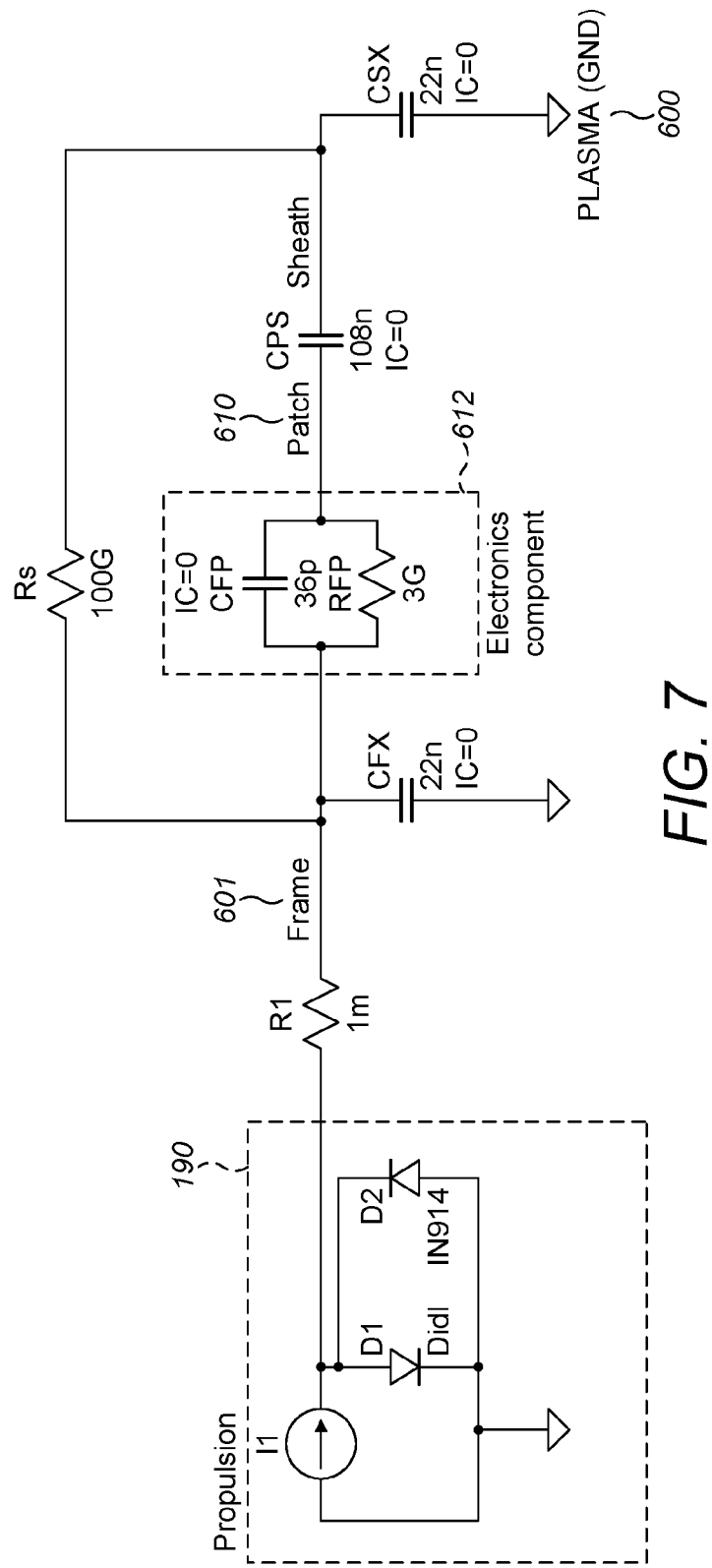
FIG. 7 shows a circuit model of electrical properties of components of satellite and the surrounding plasma in accordance with some embodiments of the present invention.

FIG. 7 shows a SPICE circuit model of electrical properties of components of the satellite 140 and the surrounding plasma, in greater detail. Specifically the components modelled in the circuit of FIG. 7 comprise the propulsion system 190, satellite frame 601, electronic components 612, metal structures 610 (a patch antenna is used to represent metal areas and/or metal traces), the surrounding plasma 600 and additionally the protective sheath 620 e.g. a film covering such as a multilayer insulation blanket as is known in the art. In space, the plasma is equivalent to ground on earth. Any of the frame 601, patch 610 and sheath 620 may form one "side" of a capacitor. The patch 610 is of particular interest because it is directly connected to electrical components so that any voltage difference on the patch will affect the electronic components, including for example semiconductor switches that have been found to be susceptible to damage.

As shown in FIG. 7, the propulsion system 190 is modelled as a current source 11 connected to a pair of diodes, D1 and D2, arranged in a parallel configuration in opposite directions, and the entire propulsion system grounded. The connection the of propulsion system 190 to the components 612, i.e. the electrical connection due to the satellite frame 601 is modelled as a 1 m ohm resistor R1.

According to FIG. 7, the frame 601 connects the propulsion system 190 to the electronic components 612. According to the model, capacitance between the frame and the plasma is modelled as a 22 nF capacitor, CFX. The electronic components are modelled as an RC circuit wherein R represents resistance between the Frame and Patch, RFP, at a rating of 3 GOhm, and C represents capacitance between the Frame and Patch, CFP, at a rating of 36 pF. The patch is connected to sheath and the plasma and is modelled as a 108 nF capacitor, CPS.

To summarise, in FIG. 7:
CFX represents Capacitance Frame to Plasma
CFP represents Capacitance Frame to Patch and is equivalent to C1 in FIG. 6
RFP represents Resistance Frame to Patch
CPS represents Capacitance Patch to Sheath
CSX represents Capacitance Sheath to Plasma
(CPS+CSX) from FIG. 7 is equivalent to C2 in FIG. 6.

It will be appreciated that the sheath which is not discussed with reference to FIG. 6 is an additional source of capacitance that may lead to an increase in voltage in the same way as the metal structures 610. Therefore, as will be appreciated from the description of FIG. 6, dangerous conditions for the components may arise if CSX>>CFP.

Figure 8:
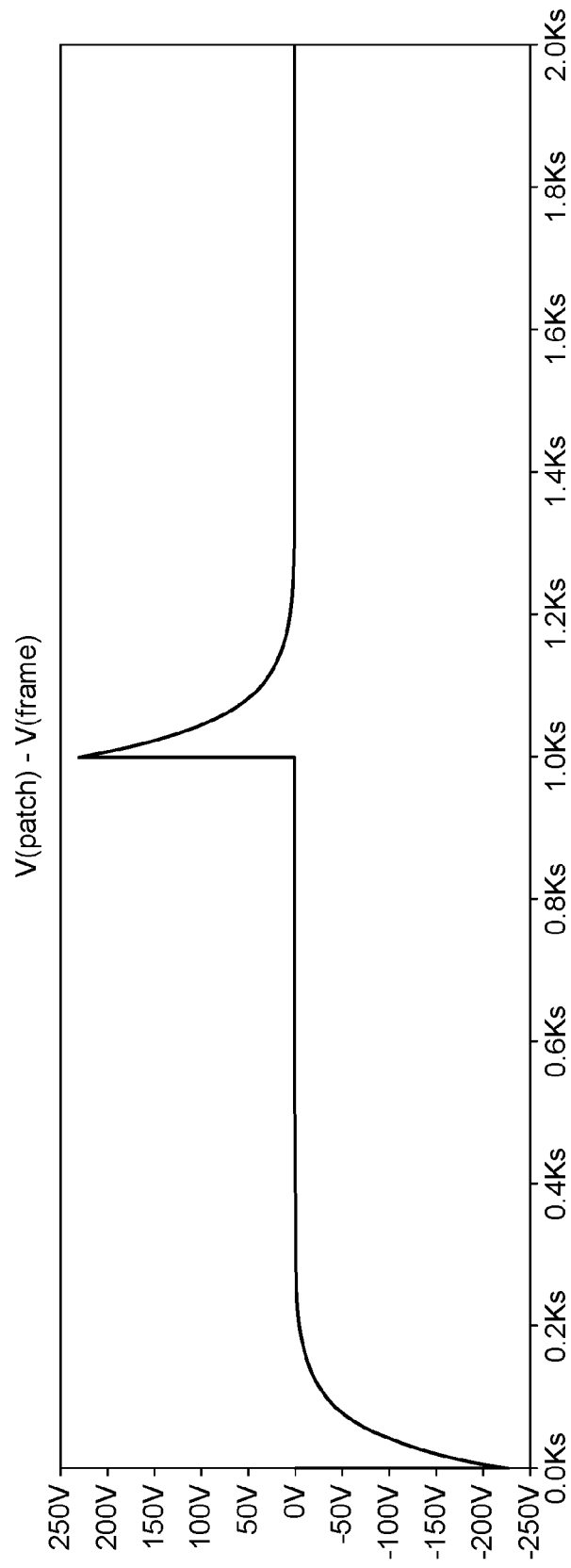
FIG. 8 is a graph showing variation in the potential difference between a patch and the spacecraft frame over time in accordance with some embodiments of the present invention.

FIG. 8 is a graph showing variation in the potential difference between the patch and the frame over time. In FIG. 8, V(patch) is equivalent to V1 in FIG. 6 and V(frame) is equivalent to V3 in FIG. 6. Thus the graph is showing the variation of V2. When an electron source is switched on at time 1.0 Ks, V2 rises very sharply, possibly up to 250V, and thereafter decays. This voltage spike may cause damage to components or parts of components such as PIN diodes will be damaged. This damage has been observed in the operation of satellites.

However it can be seen that the voltage decays over time due to the equivalent capacitor dissipating its charge and therefore if the rate of production of electrons could be constrained, no peak would occur because the voltage would not build up.

Therefore according to some embodiments of the invention, an electron source is controlled to constrain the production of electrons to ramp up gradually from an OFF state to an ON state of the electron source.

Ordinarily an electron source is controlled by an ON/OFF signal so that the time taken between OFF and ON states is constrained only by the hardware, in a manner analogous to switching on a light bulb. According to some embodiments of this invention, the duration of the ramping up is longer than the time it would take for the electron source to switch on whereby the production of electrons is constrained beyond the constraint of the electron source hardware. In other words, the rate of increase of electron emission is actively controlled via the control signal rather than being passively constrained via the hardware components of the electron source. In this way the increase in the flow of electrons between ON and OFF can take place more gradually.

A similar effect to that described with reference to FIGS. 6 and 7 is believed to take place when the electron sources are switched off, as indicated by the negative voltage spike at 0 Ks in FIG. 8. Therefore according to some embodiments of the invention an electron source may be constrained to ramp down gradually from an ON state to an OFF state, rather than being allowed to suddenly cease production of electrons.

The control may be by means of a control signal which may be a gradually increasing or decreasing voltage, e.g. a ramp. The control signal may be a digital control signal. Therefore according to some embodiments the method may be implemented with no modifications to the propulsion system hardware. Alternatively the control signal may be implemented through the use of hardware components.

The ON and OFF states of either or both of the ion source and the electron source may be defined for example as 90% and 10% of the maximum operating capacity of the source, as is standard in this art. In other words, at 10% the source is considered OFF and at 90% it is considered ON.

A thruster may comprise more than one electron source, for example as shown in FIG. 5, in which case each of the electron sources may be turned on in the same way, optionally one after another to further avoid a rapid increase in the flow of electrons.

A number of additional techniques for controlling the propulsion system are proposed here in order to mitigate damage caused by voltage spikes, which may be used alone or in combination. They may be summarised generally as:
"oversupplying" electrons by commencing generation before the supply of ions and/or continuing after the supply of ions has ceased,
controlling the ion source of a thruster in a similar way to the electron source to ramp up gradually from an ON state to an OFF state and/or to ramp down gradually from ON to OFF, and
operating an additional electron source, denoted here as an auxiliary electron source, for example from a non-operating thruster—this may be used for the "oversupply" and has the additional benefit of avoiding a step change in neutralisation current in case of emergency shutdown of one of the neutralisers in an operating thruster.

Thus in accordance with some aspects of the present invention, electrons are injected into the plasma, surrounding the spacecraft, prior to creating the stream of accelerated positively charged ions. This may be achieved by ramping up the neutraliser current so as to produce a plume of electrons before commencing creation of a stream of positively charged accelerated ions. Further, the electrons may continue to be injected into the plasma whilst the stream of positively charged ions are produced. It will be appreciated that according to some embodiments, the quantity of electrons may be more than is required to neutralise the ions from the ion source. Therefore by controlling the quantity of electrons ejected into the plasma, for example within drive thrusters or by switching on an auxiliary electron source before using the drive electron sources, the spacecraft may be maintained at a positive potential with respect to the surrounding plasma and damage to the spacecraft sensitive components may be reduced.

Regardless of whether or not the electrons are injected before the operation of the ion source commences, the ramping up or down of the electron source or sources alone is useful in avoiding a sudden rate of change of potential that may be damaging to spacecraft components.

To take the example propulsion system shown in FIGS. 2-4, according to some embodiments the ramping up or down may take place in any of the neutralisers of any of the thrusters 205, 210, 215, 220. Where multiple thrusters are present, the totality of the thrusters may be taken into consideration in determining the quantity of electrons to be supplied.

Where no additional electron source is used for the "oversupply" of electrons, this could be achieved for example by operating one or more thrusters at a lower rate of ion emission than electron emission, e.g. 75% ion emission and 100% electron emission. The proportions in practice may be determined by experimentation and/or modelling and will depend on the particular operating conditions such as but not limited to plasma density, temperature (aka kinetic energy so how fast those electrons travel) and spacecraft area. The amount of "oversupply" may be a few milliamperes would be suitable for some sizes of spacecraft and orbit (a bigger spacecraft collects more electrons, lower orbits have more dense plasma).

Where an additional electron source is used for the "oversupply" of electrons, this may be from a non-operating thruster. Therefore in the operation of multiple thrusters, one or more may be selected to operate as drive thrusters and one or more may be selected operate as auxiliary thrusters. The auxiliary thrusters may be selected to supply electrons only and therefore their thrust capability is not used. This option has the advantage that there is less risk of unexpected functional failure (some reset or other failure) as the additional electron source, e.g. auxiliary thruster, performs a simpler function.

Figure 9:
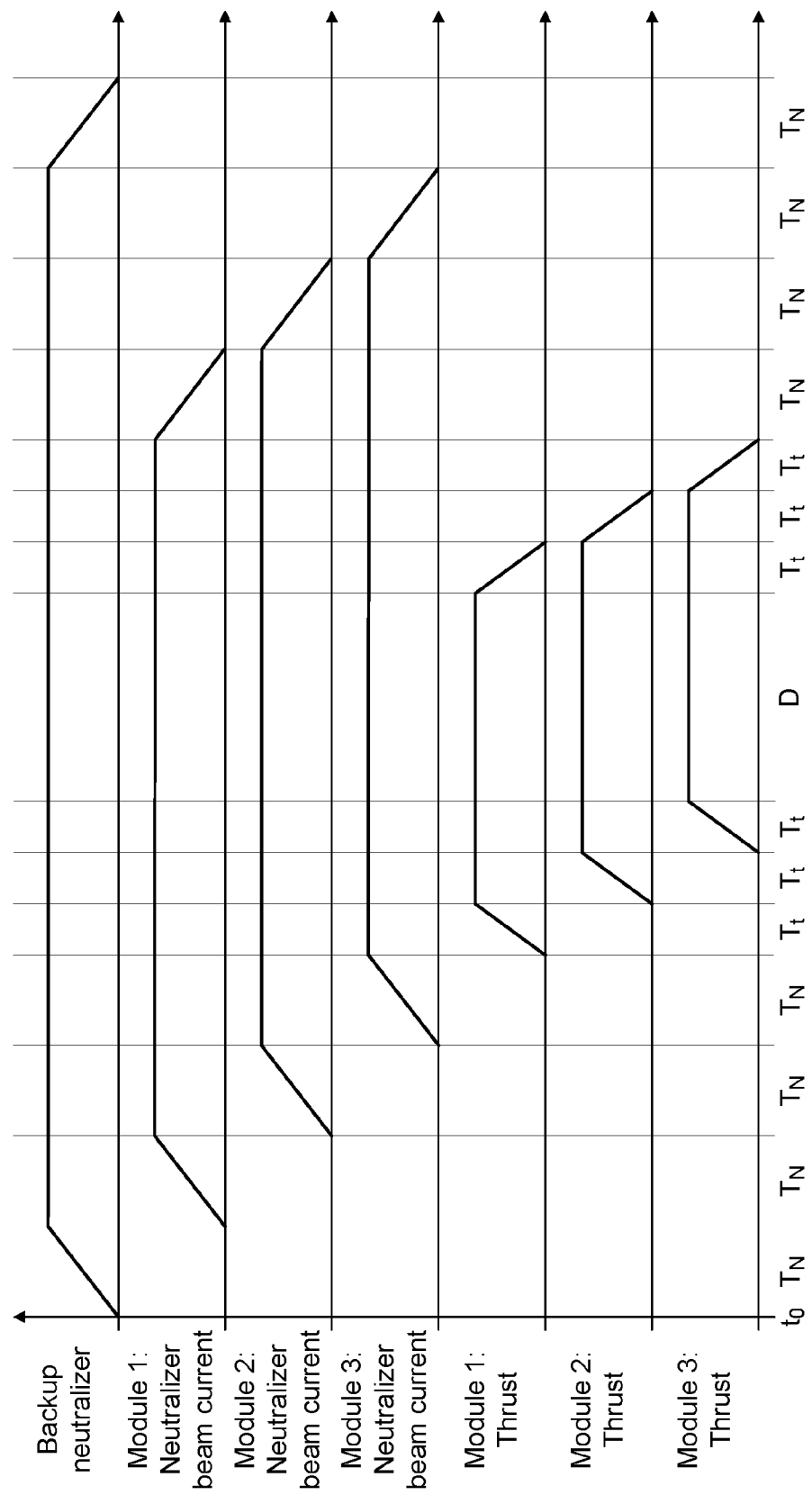
FIG. 9 shows a timing diagram illustrating a sequence of operation of electron and ion sources in accordance with some embodiments of the present invention.

FIG. 9 shows a timing diagram illustrating control signals to be applied to electron and ion sources to achieve a sequence of operation in accordance with some embodiments of the present invention. In FIG. 9, the auxiliary electron source is denoted as a backup neutraliser and the drive thrusters are denoted as modules 1, 2, 3. It can be seen that the control signals applied to the electron sources and the ion sources ramp up and down over a period of time to constrain the production of electrons or ions to ramp up gradually from an ON state to an OFF state or vice versa. This is in contrast to an ON/OFF switch which transitions from the ON to the OFF state faster than the item being controlled can transition from ON to OFF or vice versa so that the rate of change of flow is limited only by the item hardware.

In general the sequence has the following novel features which may be implemented alone or in any combination:

operating the at least one electron source of each drive thruster to inject electrons into the plasma surrounding the spacecraft prior to operating the ion source to create an ion stream to propel the spacecraft—it can be seen that for each module 1, 2, 3 the neutraliser beam current is switched on before the "thrust" or ion stream;

continuing to operate at least one electron source of each drive thruster to inject electrons into the plasma after operation of the ion source of the same drive thruster has ceased—it can be seen that for each module 1, 2, 3 the neutraliser beam current is switched off after the thrust is switched off;

commencing operation of an electron source of all of the drive thrusters before commencing operation of any of the ion sources of any of the drive thrusters, optionally one after another—it can be seen that all of module 1, 2, 3 beam currents are switched on before any of the module 1, 2, 3 thrusters are switched on, and the beam currents are switched on in turn before the thrusters are switched on in turn;

continuing to operate at least one electron source of all of the drive thrusters after operation of all of the ion sources has ceased, optionally ceasing operation one after another—it can be seen that all of the module 1, 2, 3 thrusters are switched off before any of the module 1, 2, 3 neutraliser beam currents are switched off, and the thrusters are switched off in turn before the neutraliser beam currents are switched off in turn;

commencing operation of the ion sources one after another—module 1, 2, 3 beam currents commence one after the other;

ceasing operation of the ion sources one after another—module 1, 2, 3 beam currents cease one after the other;

selecting at least one thruster as an auxiliary thruster and operating the ion source of the auxiliary thruster to commence before the operation of the ion or electron sources of any of the drive thrusters and/or cease after the cessation of operation of all of the ion or electron sources of the drive thrusters—the backup neutraliser is switched on before any of the module 1, 2, 3 beam currents or thrust and switched off after any of the module 1, 2, 3 beam currents or thrust.

According to the sequence of FIG. 9 the respective control signals for switching on and off of the beam currents, i.e. the commencement and cessation of operation, are ramped up and down respectively over a time TN for each of the modules and for the backup neutraliser. This time required to ramp up or ramp down may be calculated using standard current models. In FIG. 9 this is shown to be the same for the switching on and off of all the neutraliser beam currents but may not always be the case, it may differ between on and off and from one neutraliser to another. Similarly the switching on and off of the thrust (ion sources) is ramped up and down respectively over a time Ti which is shown to be the same for each module but may differ between on and off and from one electron source to another. According to some embodiments, the ramping up and/or the ramping down for ion sources or electron sources may have a duration greater than 1 second, optionally greater than 5 seconds or even greater than 10 seconds. In principle there is no upper limit to the ramping up or ramping down periods for the ion sources or the electron sources, since the slower this is achieved, the better. For practical purposes, the upper limit may be 10 minutes, optionally 2 minutes or 1 minute. In the embodiment shown in FIG. 9 the ramp periods for the ion sources are shorter than the ramp periods for the electron sources.

It will be noted in FIG. 9 that there is a time period D during which all of the modules, or drive thrusters, and all of the neutralisers including the backup, are on. D represents a nominal thrust time and is determined from the desired duration of travel of the spacecraft.

As noted elsewhere, some embodiments of the invention involve selecting one or more thrusters as an auxiliary thruster. This is operated only as an electron source and does not emit ions. The selection of auxiliary thruster, when required, may differ from one drive operation to another, for example so as to even out the amount of wear on thrusters. Alternatively an auxiliary thruster may be chosen based on its proximity to components, e.g. spacecraft subsystems, that are known or found to get hot. A thruster operating as auxiliary thruster generates less heat and therefore will not create additional undesirable heat.

In an embodiments of the present invention, the orbit or orbital path of the satellite is not limited and may for example include any Geostationary orbit (GEO), Low Earth orbit (LEO), Medium Earth orbit (MEO), Polar orbit and Sun-synchronous orbit (SSO), Transfer orbits and geostationary transfer orbit (GTO), and Lagrange points (L-points). However, in some embodiments of the present invention, the person skilled in that art would readily understand that testing the satellite in a lab (for example, in a test lab on the ground) may be required before launching into space.

Embodiments of the invention may be useful in mitigating damage to various parts of the satellite and not only the specific components described above. Any of the components discussed below may also be susceptible to damage that may limit the functioning of the satellite.

As shown in FIGS. 2-4, the antenna or antenna arrays 180 on board the satellite 140 are configured to receive or transmit RF signals conveyed to or from them, via RF connectors (not shown). These may be standard RF connectors such as snap fit or push connectors. The connectors connect the antenna or antenna array to one or more amplifiers on a board (not shown) where the RF signals are amplified. In receive mode, the amplified signals may output by the amplifiers to the computing system. Sensor signals may be encoded for transmission, either at the computing system or at the communication system.

In the case of earth observation satellites the sensors may include radar antennas. The sensors may also include any of image capturing devices, temperature sensors and more, as will be known to those skilled in the art. The power source may include power storage, for example in the form of one or more batteries, provided for example to enable the satellite to operate in low sunlight conditions. This is useful for example if equipment carried by the satellite is required to perform monitoring at all times.

Satellites according to some embodiments of this invention may also comprise systems not described further herein such as but not limited to a heat control system, an attitude control system to ensure that the satellite points in the correct direction.

The term 'computing system' is used herein to refer to any device or group of devices with processing capability such that it/they can execute instructions. Those skilled in the art will realise that such processing capabilities are incorporated into many different devices and therefore the term 'computing system' as used herein may include PCs, servers and many other devices.

The components described herein are not necessarily physically separated from each other unless otherwise stated, and the functionality of components illustrated in the figures may be distributed or shared between different or the same physical devices. For example, some of the functions of a communication system may be performed by a computing system and vice versa.

It will be understood that the benefits and advantages described above may relate to one embodiment or may relate to several embodiments. The embodiments are not limited to those that solve any or all of the stated problems or those that have any or all of the stated benefits and advantages.

Any reference to 'an' item refers to one or more of those items. The term 'comprising' is used herein to mean including the method steps or elements identified, but that such steps or elements do not comprise an exclusive list and a method or apparatus may contain additional steps or elements.

As used herein, the terms "component" and "system" may encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices.

Further, to the extent that the term "includes" is used in either the detailed description or the claims, such term is intended to be inclusive in a manner similar to the term "comprising" as "comprising" is interpreted when employed as a transitional word in a claim.

The figures illustrate exemplary methods. While the methods are shown and described as being a series of acts that are performed in a particular sequence, it is to be understood and appreciated that the methods are not limited by the order of the sequence unless otherwise stated. For example, some acts can occur in a different order than what is described herein. In addition, an act can occur concurrently with another act. Further, in some instances, not all acts may be required to implement a method described herein.

It will be understood that the above description of a embodiments is given by way of example only and that various modifications may be made by those skilled in the art. What has been described above includes examples of one or more embodiments. It is, of course, not possible to describe every conceivable modification and alteration of the above devices or methods for purposes of describing the aforementioned aspects, but one of ordinary skill in the art can recognize that many further modifications and permutations of various aspects are possible. Accordingly, the described aspects are intended to embrace all such alterations, modifications, and variations that fall within the scope of the appended claims.

The invention claimed is:

1. A method of operating a spacecraft propulsion system comprising at least one thruster, the at least one thruster comprising an ion source for creating a stream of ions to propel the spacecraft and a neutralizer comprising an electron source for emitting electrons from the spacecraft to neutralize the stream of ions, the method comprising:
   applying control signals to the neutralizer to one or both of:
   ramp up from an OFF state of the electron source associated with a first voltage to an ON state of the electron source associated with a second voltage to increase a flow of electrons wherein the ramp up comprises a first plurality of voltages over a first time between the first voltage and the second voltage as specified by the control signals and wherein the first plurality of voltages and the first time are selected such that a rate of increase of the flow of electrons is slower than when the electron source is switched instantaneously from the first voltage to the second voltage; and ramp down from the ON state of the electron source associated with the second voltage to the OFF state of the electron source associated with the first voltage to decrease the flow of electrons wherein the ramp down comprises a second plurality of voltages over a second time between the first voltage and the second voltage as specified by the control signals and wherein the second plurality of voltages and the second time are selected such that a rate of decrease of the flow of electrons is slower than when the electron source is switched instantaneously from the second voltage to the first voltage.

2. The method of claim 1 comprising performing one or both of:
controlling the ion source of the at least one thruster to commence production of ions after the electron source is in the ON state, and
controlling the electron source to commence ramping down after the ion source is in the OFF state.

3. The method of claim 2 comprising controlling the ion source to constrain the production of ions to perform one or both of:
ramping up from an OFF state of the ion source to an ON state of the ion source and
ramping down from the ON state of the ion source to the OFF state of the ion source.

4. The method of claim 1 wherein one or both of the ramping up and the ramping down has a duration greater than 1 second.

5. The method of claim 1 wherein one or both of the ramping up and the ramping down has a duration less than 10 minutes.

6. The method of claim 1 wherein the propulsion system comprises a plurality of thrusters, each comprising an ion source for supplying ions to propel the spacecraft and at least one neutralizer comprising an electron source.

7. The method of claim 6 comprising controlling the operation of the ion sources to commence after the electron sources of all of the plurality of thrusters are in the ON state.

8. The method of claim 6 comprising controlling the ion sources of the respective thrusters to commence operation one after another.

9. The method of claim 6 comprising controlling the electron sources of the respective thrusters to commence operation one after another.

10. The method of claim 6 comprising controlling the electron sources of each of the plurality of thrusters to continue to operate after operation of all of the ion sources has ceased.

11. The method of claim 6 comprising controlling the ion sources of the respective thrusters to cease operation one after another, optionally after one has reached the OFF state.

12. The method of claim 6 comprising operating an additional thruster to generate electrons and not to generate ions, and operating the electron source of the additional thruster to perform one or both of:
commencing before the operation of the ion or electron sources of any of the plurality of thrusters; and
ceasing after the cessation of operation of all of the ion or electron sources of the plurality of thrusters.

13. A spacecraft propulsion system comprising:
at least one thruster, including (i) an ion source for creating a stream of ions to propel the spacecraft and (ii) a neutralizer comprising at least one electron source for emitting electrons from the spacecraft to neutralize the stream of ions; and
a controller that applies control signals to the neutralizer to one or both of:
ramp up from an OFF state of the electron source associated with a first voltage to an ON state of the electron source associated with a second voltage to increase a flow of electrons wherein the ramp up comprises a first plurality of voltages over a first time between the first voltage and the second voltage as specified by the control signals and wherein the first plurality of voltages and the first time are selected such that a rate of increase of the flow of electrons is slower than when the electron source is switched instantaneously from the first voltage to the second voltage; and
ramp down from the ON state of the electron source associated with the second voltage to the OFF state of the electron source associated with the first voltage to decrease a flow of electrons wherein the ramp down comprises a second plurality of voltages over a second time between the first voltage and the second voltage as specified by the control signals and wherein the second plurality of voltages and the second time are selected such that a rate of decrease of the flow of electrons is slower than when the electron source is switched instantaneously from the second voltage to the first voltage.

14. A computer readable medium comprising instructions for implementation in a spacecraft propulsion system comprising at least one thruster, the at least one thruster comprising an ion source for creating a stream of ions to propel the spacecraft and a neutralizer comprising an electron source for emitting electrons from the spacecraft to neutralize the stream of ions, wherein when the instructions are implemented in a processor in a spacecraft propulsion system controllers the system is caused to operate at least one thruster by controlling the neutralizer, with control signals applied thereto, to constrain production of electrons to perform one or both of:
ramping up from an OFF state of the electron source associated with a first voltage to an ON state of the electron source associated with a second voltage to increase a flow of electrons wherein the ramping up comprises a first plurality of voltages over a first time between the first voltage and the second voltage as specified by the control signals and wherein the first plurality of voltages and the first time are selected such that a rate of increase of the flow of electrons is slower than when the electron source is switched instantaneously from the first voltage to the second voltage; and
ramping down from the ON state of the electron source associated with the second voltage to the OFF state of the electron source associated with the first voltage to decrease the flow of electrons
wherein the ramping down comprises a second plurality of voltages over a second time between the first voltage and the second voltage as specified by the control signals and wherein the second plurality of voltages and the second time are selected such that a rate of decrease of the flow of electrons is slower than when the electron source is switched instantaneously from the second voltage to the first voltage.

\* \* \* \* \*